(12) United States Patent
Kamamori

(10) Patent No.: US 9,747,023 B2
(45) Date of Patent: Aug. 29, 2017

(54) INFORMATION PROCESSING APPARATUS AND METHOD THEREOF

(71) Applicant: CANON KABUSHIKI KAISHA, Tokyo (JP)

(72) Inventor: Yuki Kamamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 14/286,234

(22) Filed: May 23, 2014

(65) Prior Publication Data

US 2014/0361981 A1 Dec. 11, 2014

(30) Foreign Application Priority Data

Jun. 7, 2013 (JP) ................................ 2013-121187

(51) Int. Cl.
G06F 3/042 (2006.01)
G06F 3/0488 (2013.01)

(52) U.S. Cl.
CPC ........ *G06F 3/04883* (2013.01); *G06F 3/0425* (2013.01)

(58) Field of Classification Search
CPC .. G06F 3/04883; G06F 3/0425; G06F 3/0488; G06F 3/017; G03B 21/00
See application file for complete search history.

(56) References Cited

U.S. PATENT DOCUMENTS

| | | | | |
|---|---|---|---|---|
| 2003/0076293 A1* | 4/2003 | Mattsson | ................ | G06F 3/017 345/156 |
| 2004/0190776 A1* | 9/2004 | Higaki | ............... | G06K 9/00375 382/190 |
| 2005/0166163 A1* | 7/2005 | Chang | ..................... | G06F 3/017 715/863 |
| 2005/0285845 A1* | 12/2005 | Dehlin | .................. | G06F 3/0481 345/173 |
| 2011/0169746 A1* | 7/2011 | Kitajima | ................ | G03B 21/00 345/173 |
| 2014/0104163 A1* | 4/2014 | Ide | ........................ | G06F 3/0425 345/156 |

FOREIGN PATENT DOCUMENTS

JP 2009-64109 A 3/2009

* cited by examiner

*Primary Examiner* — Ibrahim Khan
(74) *Attorney, Agent, or Firm* — Fitzpatrick, Cella, Harper & Scinto

(57) ABSTRACT

An image obtained by capturing a gesture input region is acquired, and an object that makes a gesture is detected from the image. An intersection position at which the detected object crosses a determination region used to determine the position of the object with respect to the gesture input region is detected from the image. The base position of the gesture made by the object is computed based on the intersection position. The position of a target of manipulation by the gesture is determined as a manipulation target position. A gesture coordinate system different from the coordinate system of the image is determined based on the base position and the manipulation target position.

12 Claims, 12 Drawing Sheets

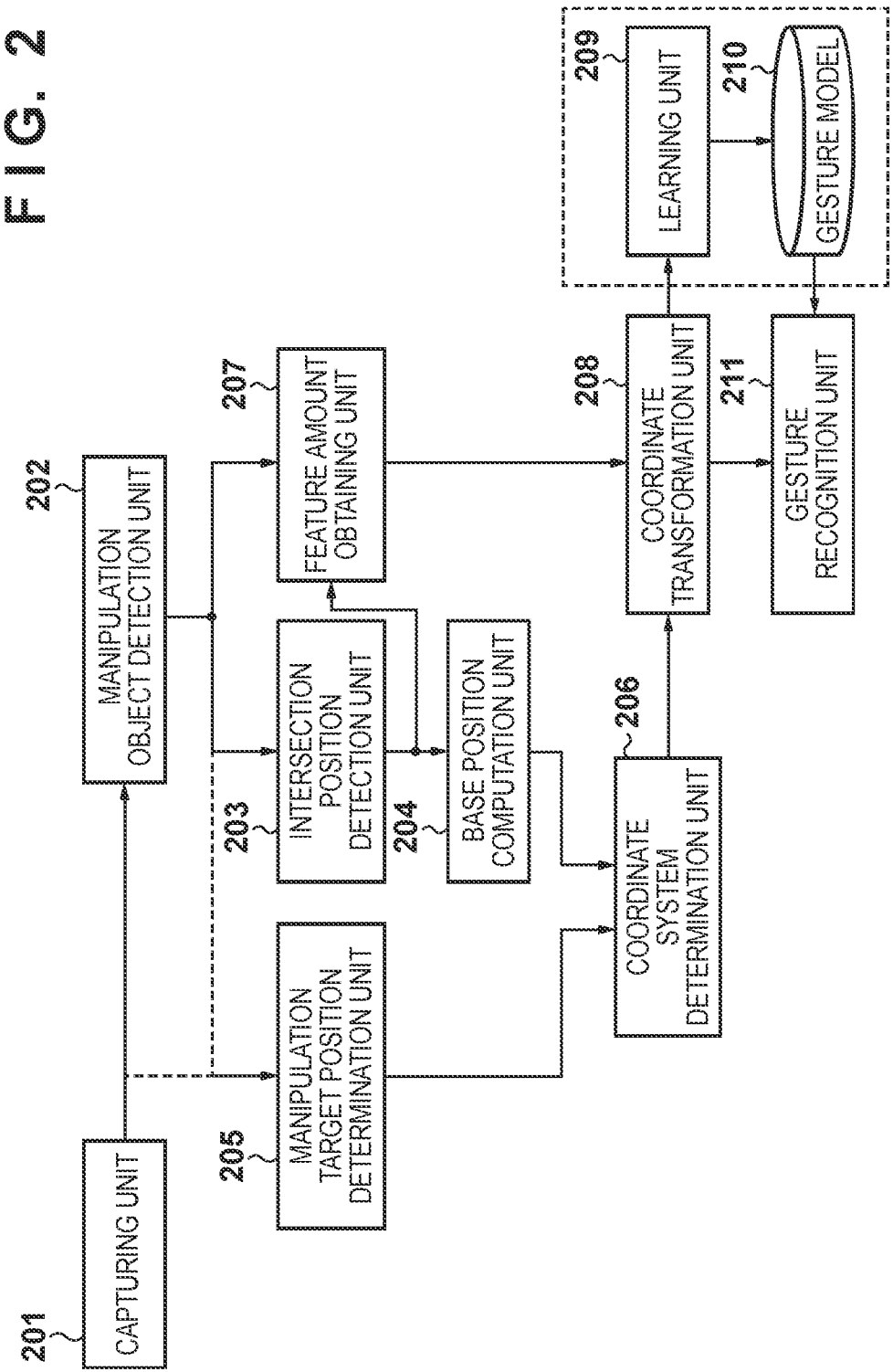

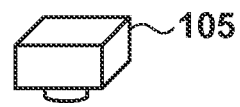
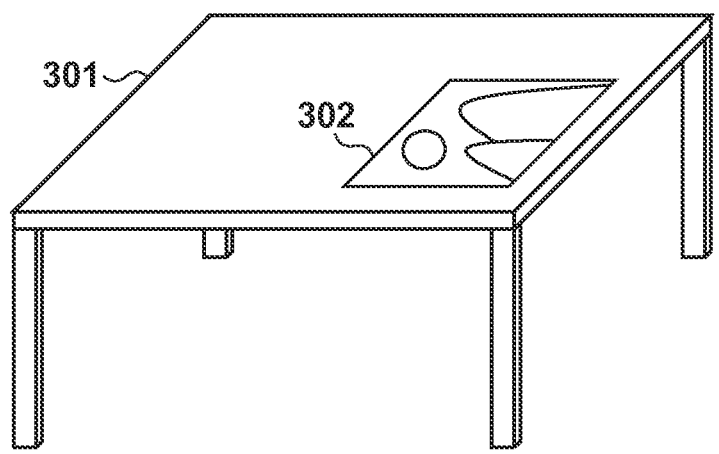

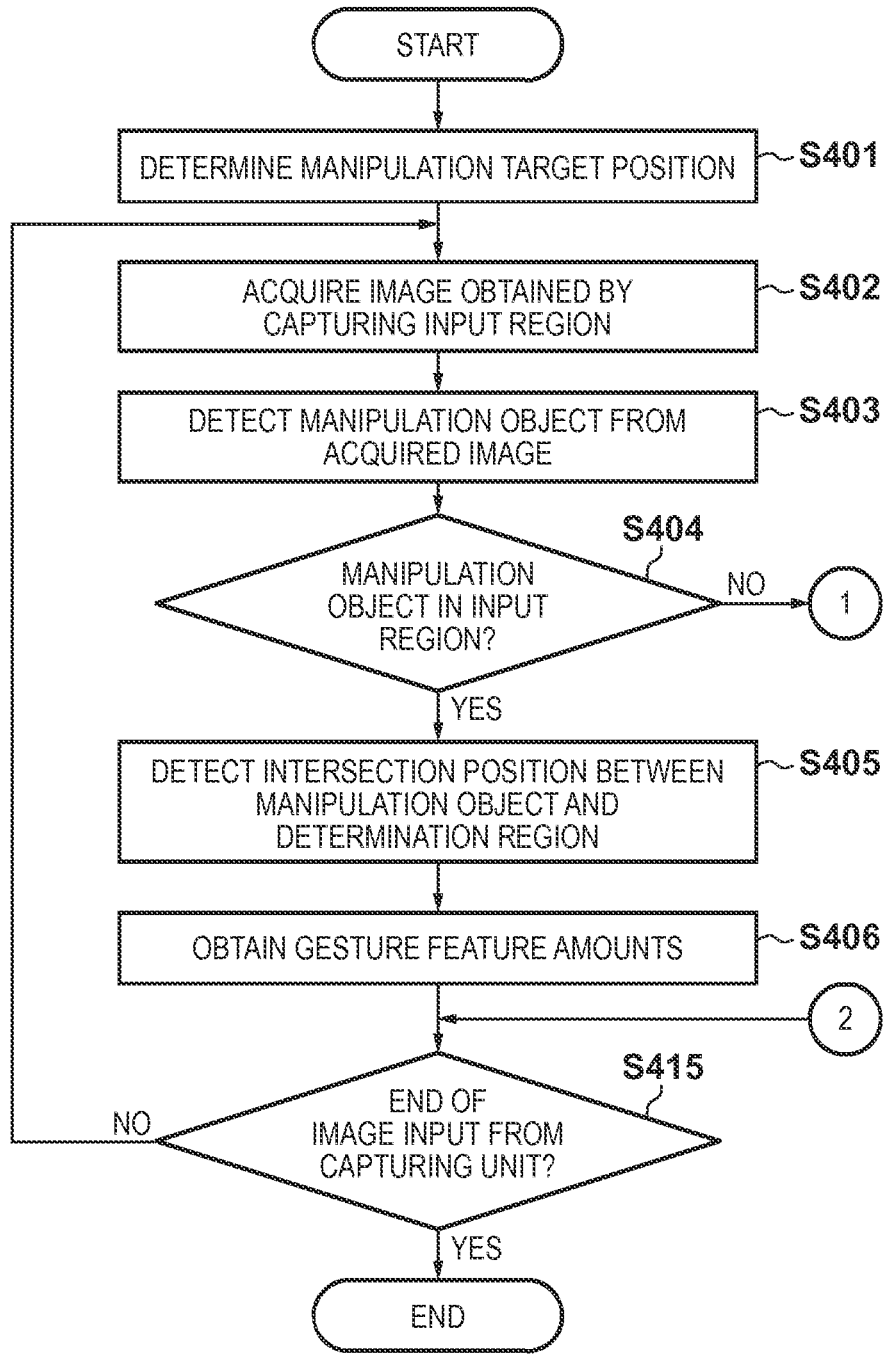

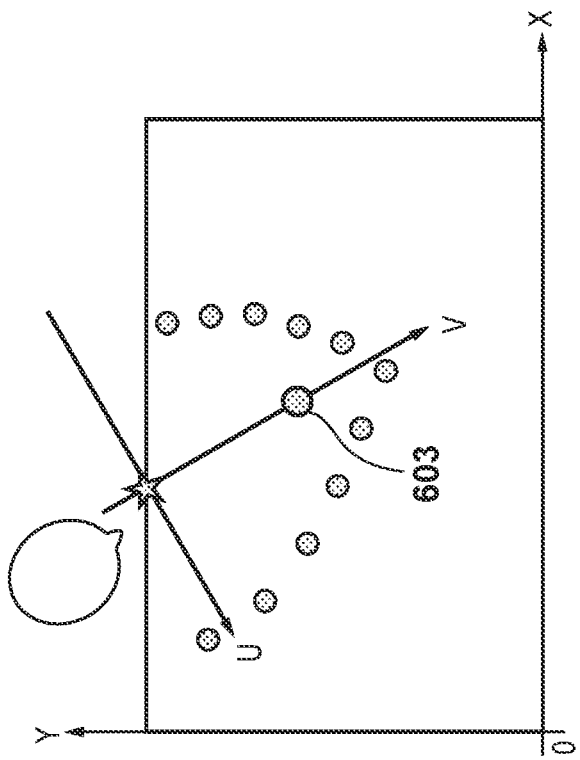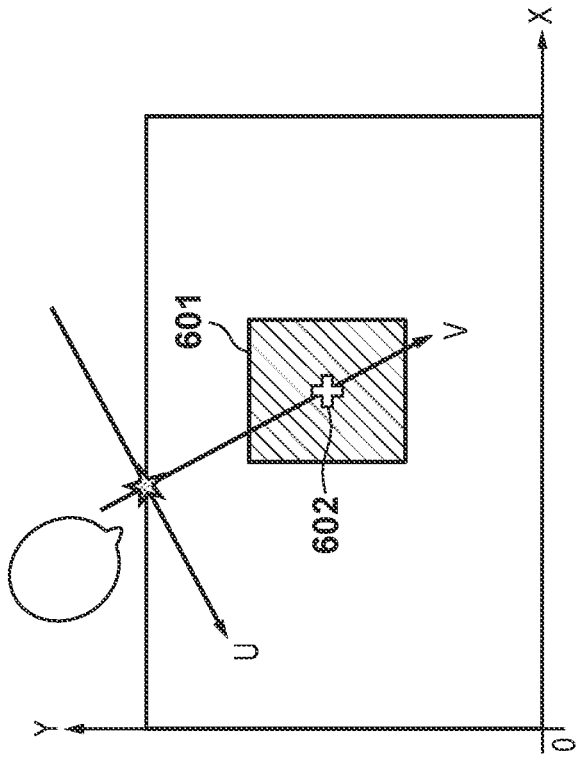

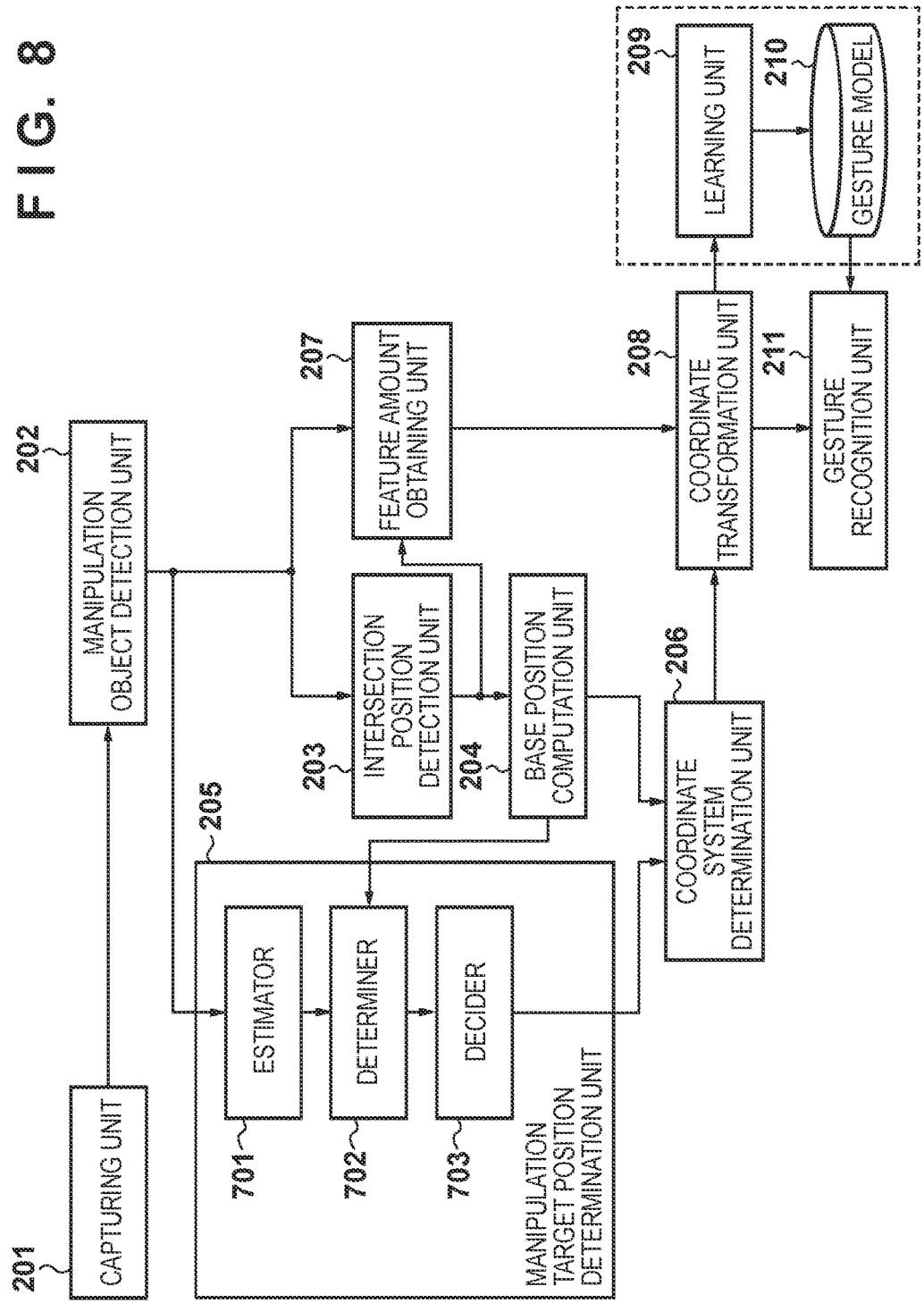

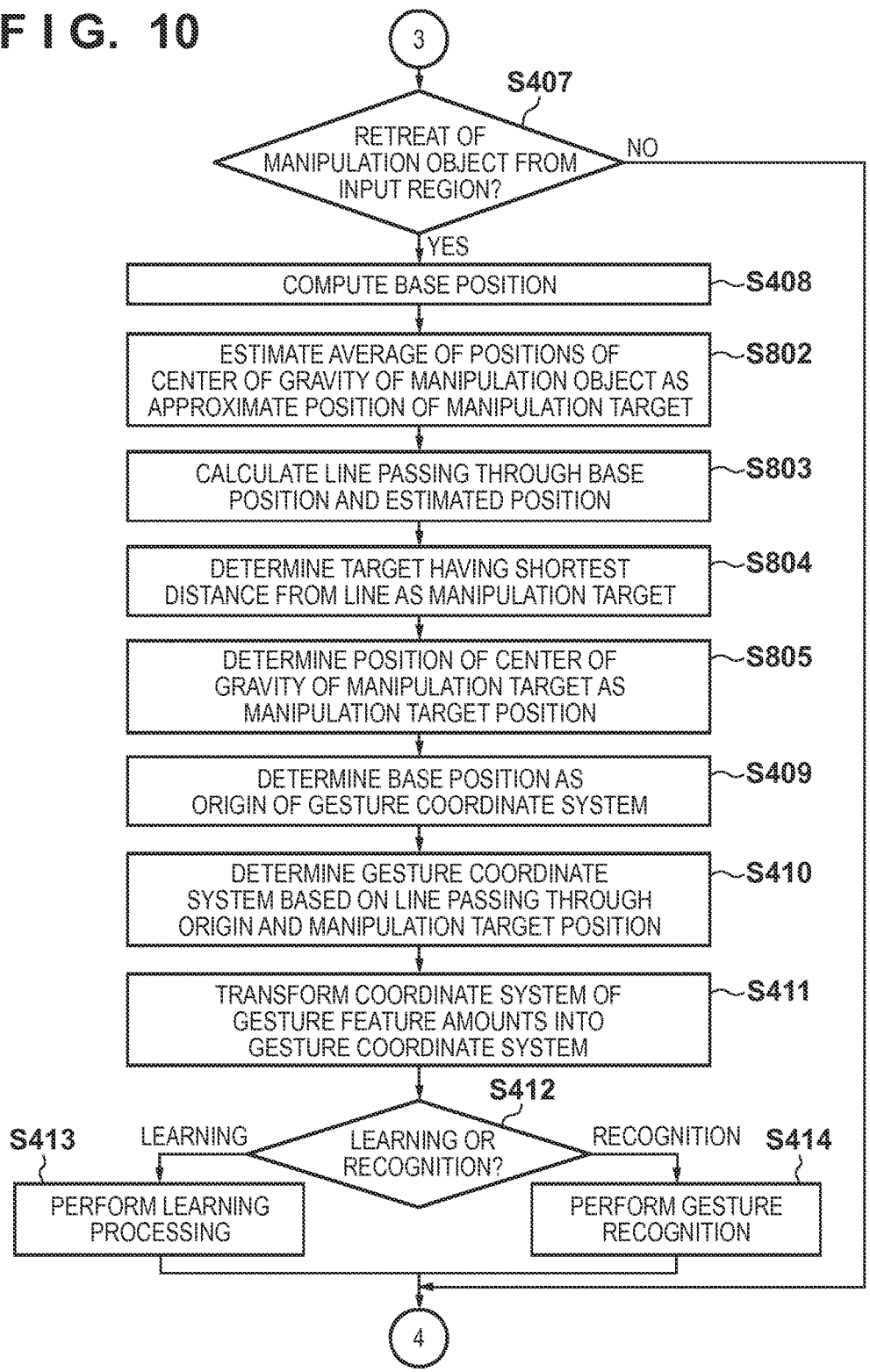

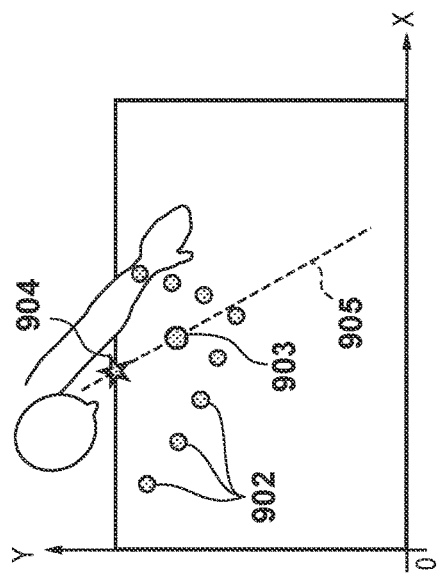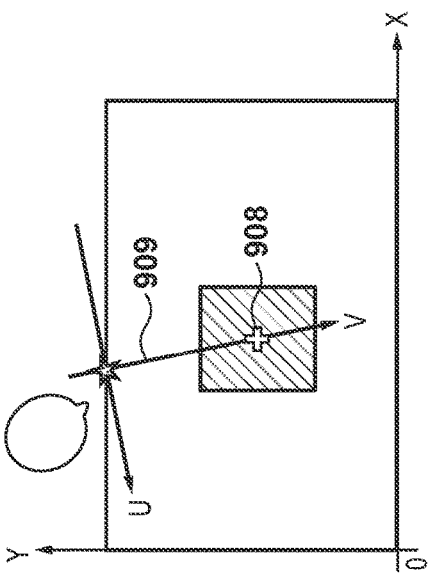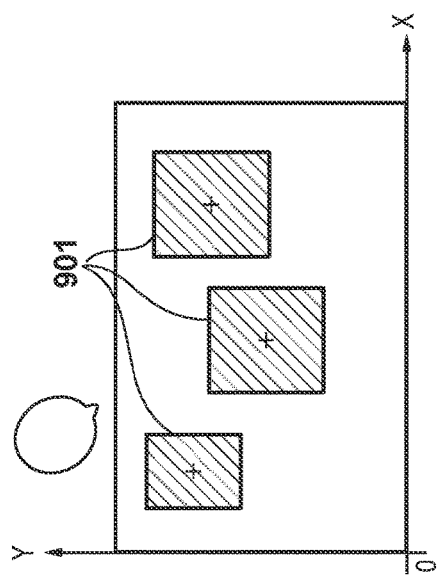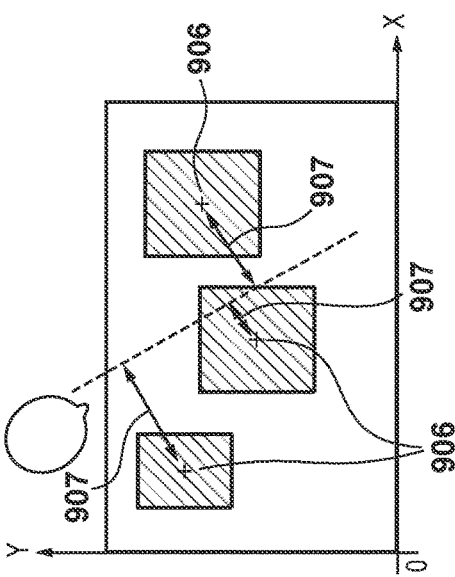

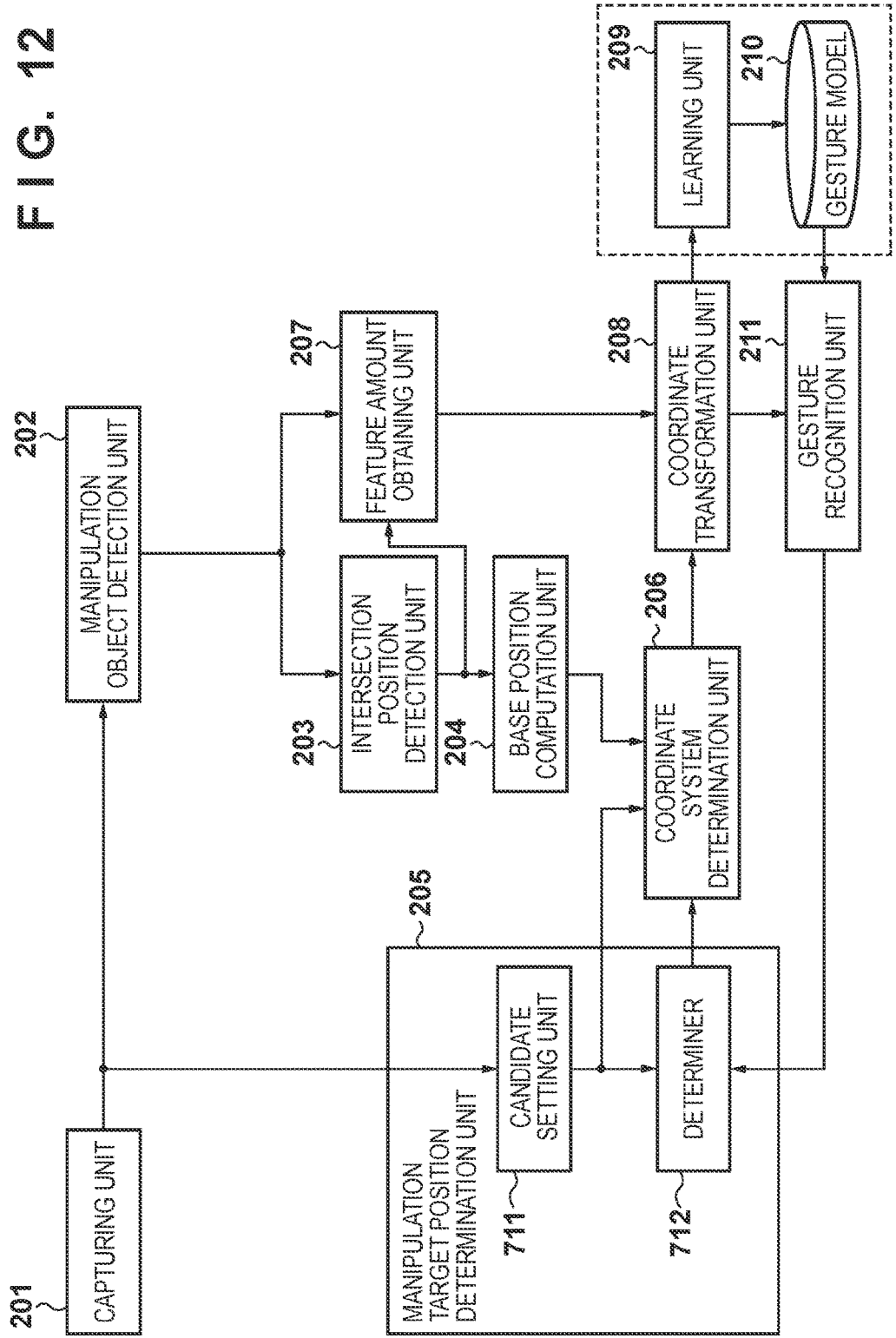

INFORMATION PROCESSING APPARATUS AND METHOD THEREOF

BACKGROUND OF THE INVENTION

Field of the Invention

The present invention relates to information processing of performing gesture recognition.

Description of the Related Art

User interfaces (UIs) capable of input by a gesture are used in many different fields. A tabletop interface is known as one of the gesture input UIs. In the tabletop interface, display contents or behaviors to a gesture input need to be switched based on which among, for example, four sides of a table is the side where the gesture input has been done and the angle of the gesture input with respect to the side (to be referred to as "user's position and orientation" hereinafter).

Especially, when recognizing a gesture, feature amounts detected by the user's position and orientation largely change, and recognition needs to be performed by classifying gestures according to user's positions and orientations. However, recognition of classified gestures is done using gesture learning data of the respective classes, and the necessary data amount increases. Additionally, it is difficult to appropriately define criteria to classify the user's positions and orientations. For these reasons, it is demanded to dynamically transform detected feature amounts into a coordinate system according to the user's position and orientation for each gesture input.

There is known a technique of detecting, from a captured image of a projection screen, a direction (insertion direction) in which a user's hand is inserted into the image projection screen, and determining the display position and orientation of a UI in accordance with the insertion direction. According to this technique, it is possible to dynamically determine a UI display coordinate system according to the user's position and orientation and transform detected feature amounts into a coordinate system independent of the user's position and orientation. That is, it is possible to obtain feature amounts independent of the user's position and orientation and recognize a gesture using them.

However, not only linear gestures of inserting a hand in the projection screen and removing the hand from the projection screen but also a gesture of, for example, waving an object (manipulation object) such as an arm used for a gesture on the projection screen is possible. Considering such a gesture, it is impossible to determine the coordinate system according to the user's position and orientation using the above-described technique of determining the coordinate system based on the insertion direction.

SUMMARY OF THE INVENTION

In one aspect, an information processing apparatus for performing gesture recognition for gesture input, comprising: an acquisition unit configured to acquire an image obtained by capturing a gesture input region; a first detection unit configured to detect an object that makes a gesture from the image; a second detection unit configured to detect, from the image, an intersection position at which the detected object crosses a determination region used to determine a position of the object with respect to the gesture input region; a computation unit configured to compute, based on the intersection position, a base position of the gesture made by the object; a first determination unit configured to determine, as a manipulation target position, a position of a target of manipulation by the gesture; and a second determination unit configured to determine a gesture coordinate system different from a coordinate system of the image based on the base position and the manipulation target position.

According to the aspect, it is possible to determine a gesture coordinate system according to the motion of a manipulation object and perform gesture recognition independent of a user's position and orientation.

Further features of the present invention will become apparent from the following description of exemplary embodiments with reference to the attached drawings.

BRIEF DESCRIPTION OF THE DRAWINGS

FIG. 2 is a block diagram showing the functional arrangement of an information processing apparatus according to the first embodiment.

FIG. 3 is a perspective view showing an example of the outline of the information processing apparatus according to the embodiment.

FIGS. 4 and 5 are flowcharts for explaining gesture recognition processing according to the first embodiment.

FIGS. 7A and 7B are views for explaining another method of determining a manipulation target position.

FIG. 8 is a block diagram showing the functional arrangement of an information processing apparatus according to the second embodiment.

FIGS. 9 and 10 are flowcharts for explaining gesture recognition processing according to the second embodiment.

FIGS. 11A to 11D are views for explaining gesture coordinate system determination processing.

FIG. 12 is a block diagram showing an example of the functional arrangement of an information processing apparatus according to a modification.

DESCRIPTION OF THE EMBODIMENTS

Information processing according to preferred embodiments of the present invention will now be described in detail with reference to the accompanying drawings. Note that the components described in the embodiments are merely examples, and the technical scope of the present invention is not limited by the components.

Information processing (to be referred to as "gesture recognition processing" hereinafter) of recognizing a gesture executed by a user in the gesture input region (to be simply referred to as an "input region" hereinafter) of a UI for gesture input will be described below. Note that a user's arm will be exemplified as an object (to be referred to as a "manipulation object" hereinafter) used for a gesture. However, another body part (finger or foot), an object (for example, stick, pole, rod, baton or the like) gripped by the user, or the like is also usable as the manipulation object.

The coordinates of a fingertip will be exemplified as feature amounts (to be referred to as "gesture feature amounts" hereinafter) used for gesture recognition. However, not only the coordinates of a fingertip but also the coordinates of the center of gravity and the coordinate change amounts of a manipulation object are usable as the gesture feature amounts. A space on a table having a video display function will be exemplified as an input region.

However, not only the space on the table but also a whole or partial range that a camera can capture can be defined as the input region.

First Embodiment (Arrangement of Apparatus)

Figure 1:
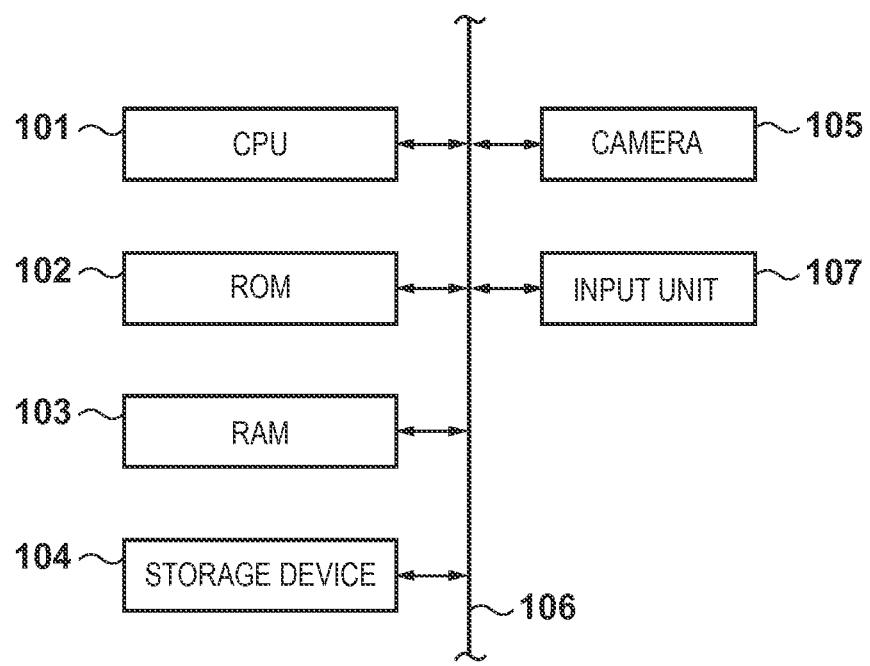
FIG. 1 is a block diagram showing the arrangement of an information processing apparatus according to an embodiment.

FIG. 1 is a block diagram showing the arrangement of an information processing apparatus according to an embodiment.

A CPU (Central Processing Unit) 101 executes an OS (Operating System) or a program stored in a ROM (Read-Only Memory) 102 or a storage device 104 using a RAM (Random Access Memory) 103 as a work memory, and controls components connected to a system bus 106, thereby performing operations and logical decisions of various kinds of processing. Processing to be executed by the CPU 101 includes gesture recognition processing according to the embodiment.

The storage device 104 is a hard disk drive or an external storage device, and stores programs and various kinds of data associated with gesture recognition processing according to the embodiment. A camera 105 captures a space (to be simply referred to as an "input region" hereinafter) including the input region of a gesture input UI and a manipulation object in the input region, and outputs the captured image to the system bus 106 under the control of the CPU 101.

An input unit 107 is an input device such as a button, a keyboard, or a touch panel used to input a user instruction. Note that the storage device 104 is connected to the system bus 106 via an interface such as a serial ATA (SATA), whereas the camera 105 and the input unit 107 are connected to the system bus 106 via a serial bus such as a USB (Universal Serial Bus), and a detailed description thereof will be omitted.

[Functional Arrangement]

FIG. 2 is a block diagram showing the functional arrangement of the information processing apparatus according to the first embodiment. Note that the function arrangement shown in FIG. 2 is implemented by causing the CPU 101 to execute a program and control the camera 105 and the like.

A capturing unit 201 captures the input region and a manipulation object in the input region. A manipulation object detection unit 202 detects the manipulation object from an image captured by the capturing unit 201. Note that in this embodiment, a user's arm is detected as the manipulation object.

An intersection position detection unit 203 detects the intersection position between a determination region (to be described later) and the manipulation object detected by the manipulation object detection unit 202. A base position computation unit 204 computes the base position of a gesture based on the intersection position detected by the intersection position detection unit 203. The base position is one of factors that determine the coordinate system (to be referred to as a "gesture coordinate system" hereinafter) of a gesture, as will be described later.

A manipulation target position determination unit 205 determines the position (to be referred to as a "manipulation target position" hereinafter) of the manipulation object by a gesture. Note that the manipulation target may be detected from an image captured by the capturing unit 201, or the manipulation target position may be detected using information of the manipulation object detected by the manipulation object detection unit 202. In the first embodiment, however, the manipulation target position is determined without using these pieces of information.

A coordinate system determination unit 206 determines a gesture coordinate system based on the base position computed by the base position computation unit 204 and the manipulation target position determined by the manipulation target position determination unit 205. A feature amount obtaining unit 207 obtains, based on the intersection position, gesture feature amounts from the manipulation object detected by the manipulation object detection unit 202. A coordinate transformation unit 208 transforms the gesture feature amounts obtained by the feature amount obtaining unit 207 into the gesture coordinate system determined by the coordinate system determination unit 206.

A learning unit 209 learns a gesture model 210 based on the feature amounts of the gesture coordinate system output from the coordinate transformation unit 208. The gesture model 210 is held in the storage device 104. Note that the learning unit 209 functions only when learning the gesture model 210 but not when recognizing a gesture.

A gesture recognition unit 211 recognizes a user's gesture based on the gesture model 210 and the feature amounts of the gesture coordinate system output from the coordinate transformation unit 208. Note that the gesture recognition unit 211 functions only when recognizing a gesture but not when learning the gesture model 210.

[Outline of Apparatus]

FIG. 3 illustrates an example of the outline of the information processing apparatus according to the embodiment. A table 301 has a video display function. An image (or video) 302 of a manipulation object is displayed on the table 301. The camera 105 is installed above the table 301. A user's gesture executed in the space (input region) on the table 301 is recognized based on an image crane-shot by the camera 105.

[Gesture Recognition Processing]

Figure 5:
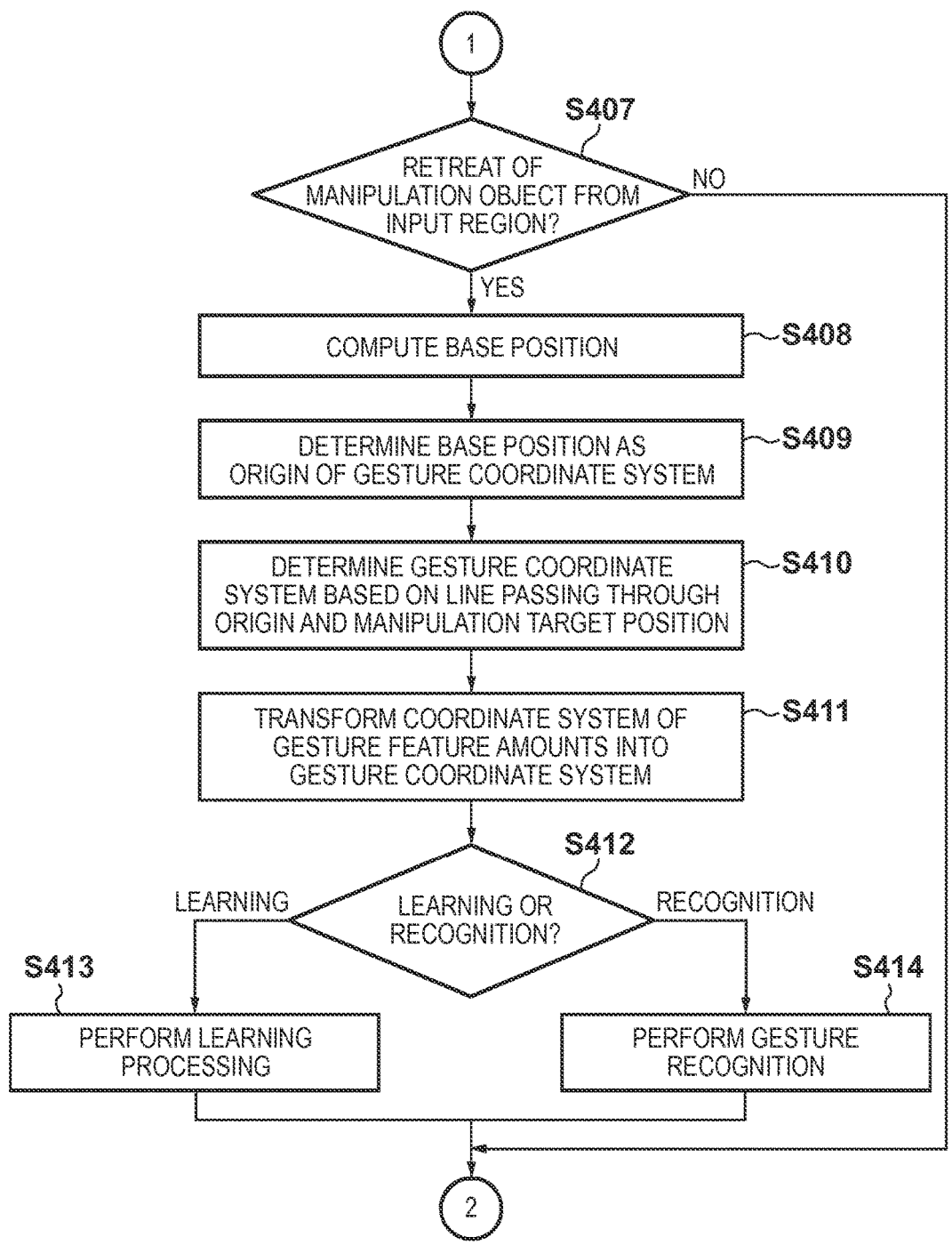

Gesture recognition processing according to the first embodiment will be described with reference to the flowcharts of FIGS. 4 and 5. The information processing apparatus causes the camera 105 to start capturing in accordance with a user instruction input via the input unit 107, and thus starts gesture recognition processing.

When gesture recognition processing starts, the manipulation target position determination unit 205 determines, for example, coordinates near the center of the input region as the manipulation target position (S401). The user is assumed to do a gesture while facing the center of the table 301 as the input region at a high possibility. In the embodiment, the manipulation target position is set at the center coordinates of the table 301. Note that in the embodiment, a gesture is recognized based on two-dimensional information in the image captured by the capturing unit 201. Hence, the coordinates in the embodiment indicate two-dimensional coordinates in the captured image.

The manipulation object detection unit 202 acquires the captured image of the input region from the capturing unit 201 (S402), and detects a manipulation object from the acquired image (S403). For example, a skin color region in the image can be detected as an arm. The detection method is preferably selected in accordance with the capturing environment and the sensor type. For example, if the background is known, and only the manipulation object is included in the image, detection by background subtraction is possible. If a projected video by a projector or the like is superimposed on the manipulation object, and detection based on colors is difficult, the manipulation object can be detected by performing detection based on the intensity of reflection of infrared light.

The manipulation object detection unit 202 determines whether the manipulation object exists in the input region (S404). For example, the presence/absence of an arm in the input region is determined based on the size of the skin color region detected in step S403. The presence/absence of an arm in the input region can more accurately be determined based on pattern recognition for the shape or motion of the skin color region. Upon determining that the manipulation object exists in the input region, the process advances to step S405. Upon determining that the manipulation object does not exist, the process advances to step S407.

Upon determining that the manipulation object exists in the input region, the intersection position detection unit 203 detects the intersection position between a determination region and the manipulation object in the image, and holds the detected intersection position in a holding portion allocated to the RAM 103 or the like (S405). In the detection of step S405, for example, a region corresponding to a side of the table 301 in the image is defined as the determination region, and the coordinates of the center of gravity of a region where the arm and the determination region are superimposed are detected as the intersection position. Note that the determination region is not limited to a side (the boundary of the input region) of the table 301 and can arbitrarily be defined. For example, when the boundary of a region (capturing range) that the camera 105 can capture is defined as the determination region, it is possible to cope with any case where the manipulation object is inserted from every position outside the capturing range into the capturable region. When the position where the manipulation object is to be inserted is assumed, unnecessary intersection detection processing can be reduced by defining a region around the position as the determination region. As described above, the determination region is a region used to determine and specify the position of the manipulation object with respect to the input region.

The feature amount obtaining unit 207 obtains gesture feature amounts from the manipulation object and holds the gesture feature amounts in the holding portion (S406). In the obtaining of step S406, for example, the coordinates of the distal end of the manipulation object farthest from the intersection position are obtained as the feature amounts. For example, when the manipulation object is an arm, its distal end is normally considered as a fingertip. Hence, the coordinates detected as feature amounts will be referred to as a "fingertip position" hereinafter. Not only the fingertip position but also the coordinates of the center of gravity of the arm region and their moving amounts per unit time can be obtained as the gesture feature amounts and used for gesture recognition processing.

On the other hand, upon determining in step S404 that the manipulation object does not exist in the input region, the manipulation object detection unit 202 determines whether the manipulation object that was in the input region retreats from the input region (S407). For example, if it was previously determined in step S405 that the manipulation object existed in the input region, the manipulation object detection unit 202 determines that the manipulation object retreats from the input region. Upon determining that the manipulation object retreats from the input region, the process advances to step S408. Upon determining that the manipulation object does not retreat from the input region, the process advances to step S415.

Upon determining that the manipulation object retreats from the input region, the base position computation unit 204 regards the action from insertion of the manipulation object into the input region to the retreat as one gesture, and computes the average position of the intersection positions between the manipulation object and the determination region during this action as the base position (S408). In the computation of step S408, the intersection position held in the holding portion is used. Note that the average position indicates the average value of coordinates. If the timings of the start and end of the gesture can be detected from, for example, a state transition based on a change in the moving speed of the manipulation object, the average position of intersection positions from the start to the end of the gesture may be computed as the base position.

The coordinate system determination unit 206 determines the base position as the origin of a gesture coordinate system (S409), and determines a gesture coordinate system based on a line passing through the origin and the manipulation target position (the center of the table 301) (S410). In the embodiment, the coordinate system determination unit 206 determines a gesture coordinate system having a vector from the origin (base) to the manipulation target position as a V axis and an axis obtained by rotating the V axis clockwise by 90° as a U axis.

The coordinate transformation unit 208 transforms the coordinate system of the gesture feature amounts into the gesture coordinate system based on a transformation formula to be described later (S411). In the transformation of step S411, the gesture feature amounts held in the holding portion are used. It is determined whether it is the time of learning or recognition (S412). At the time of learning, the learning unit 209 performs learning processing (S413). At the time of recognition, the gesture recognition unit 211 performs gesture recognition (S414). In the embodiment, an HMM (Hidden Markov Model) that is a probability model formed from the transition probability between states having a feature amount output distribution is used as the gesture model.

The learning unit 209 learns the gesture model 210 based on the feature amounts of the gesture coordinate system (S413). In the embodiment, an HMM is learned as the gesture model, and parameters are calculated by a learning algorithm such as an expectation-maximization (EM) algorithm. Note that the learning processing of step S413 is executed only at the time of learning. Note that whether it is the time of learning or recognition is designated by the user at the start of gesture recognition processing.

The gesture recognition unit 211 recognizes a gesture based on matching between the gesture model 210 and the feature amounts of the gesture coordinate system (S414). In the embodiment, matching between the feature amounts and the gesture model is performed, and a gesture represented by a model having the maximum likelihood is output as a recognition result. The Viterbi algorithm is used in a search for maximum-likelihood path upon matching. Note that the recognition processing of step S414 is executed only at the time of gesture recognition.

When the processing of step S406, S413, or S414 has ended, or when it is determined in step S407 that it is not the timing the manipulation object retreats from the input region, the manipulation object detection unit 202 determines whether the image input from the capturing unit 201 has ended (S415). When the image input has ended, the gesture recognition processing ends. When the image input continues, the process returns to step S402 to perform gesture recognition processing for a newly acquired image.

[Coordinate Transformation]

Processing of transforming the coordinates of gesture feature amounts into a gesture coordinate system will be described. FIGS. 6A to 6D show images obtained by capturing the space on the table 301 from the camera 105.

Figure 6A:
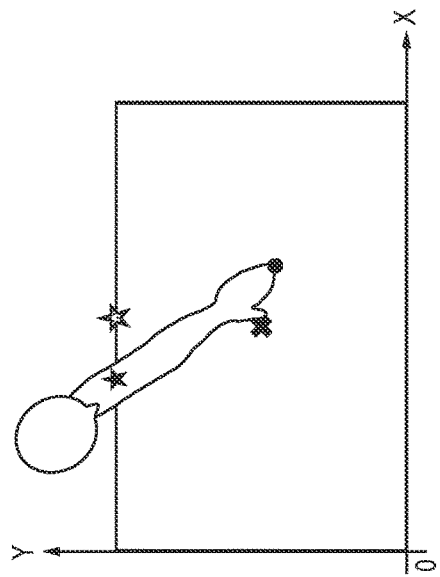
FIGS. 6A to 6D are views showing images obtained by capturing a space on a table from a camera.
Figure 6B:
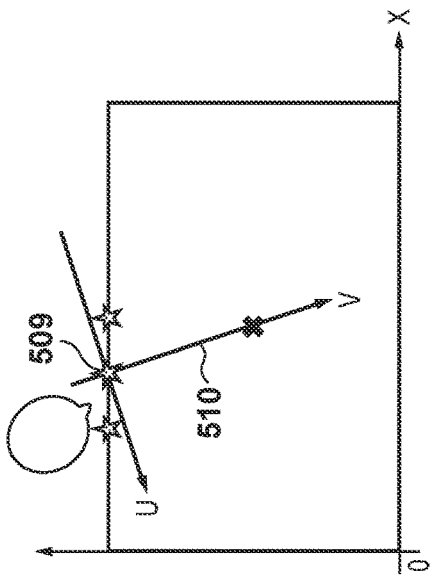
Figure 6C:
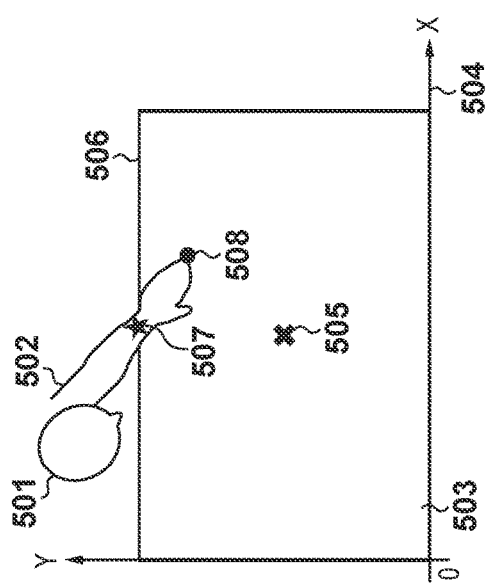
Figure 6D:
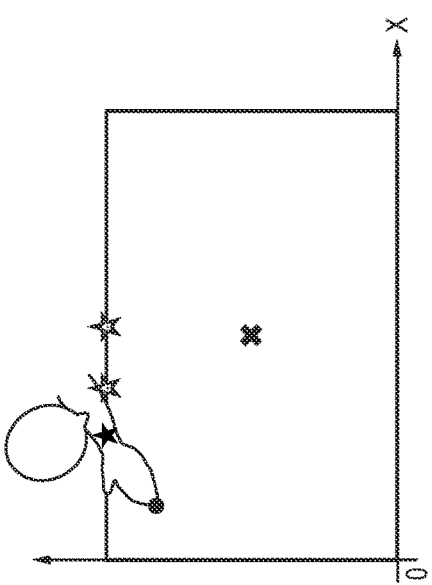

A user 501 executes a gesture by moving an arm 502 in an input region 503 in the space on the table 301. Note that FIG. 6A shows a state in which the arm is inserted into the input region 503, FIGS. 6B and 6C show the actions of the arm in the input region 503, and FIG. 6D shows a state in which the arm retreats from the input region 503.

From Determination of Manipulation Target Position to Detection of Fingertip Position First, the center position of the table 301 is determined as a manipulation target position 505 on a basic coordinate system 504 defined in the image. A manipulation target position Target is given by $$\text{Target} = (x_T, y_T)_o^T \quad (1)$$

where "o" at the end represents the coordinates of the basic coordinate system 504, and "T" at the end represents a transposed matrix.

Next, the arm region is detected. Based on whether coordinates $(x, y)_o^T$ are included in the arm region, a value $\text{Arm}(x, y)_o$ is determined by if $((x, y)_o^T \in \text{arm region})$ $$\text{Arm}(x, y)_o = \text{'}10\text{'};$$

else $$\text{Arm}(x, y)_o = \text{'}0\text{'}; \quad (2)$$

Based on whether the coordinates $(x, y)_o^T$ are included in a determination region 506, a value $\text{Border}(x, y)_o$ is determined by if $((x, y)_o^T \in \text{determination region})$ $$\text{Border}(x, y)_o = \text{'}1\text{'};$$

else $$\text{Border}(x, y)_o = \text{'}0\text{'}; \quad (3)$$

Note that the determination region 506 is known.

The average position of the points of center of gravity of arm regions on the determination region 506 is calculated, as an intersection position 507, by $$\text{Cross} = (x_c, y_c)_o^T \quad (4)$$

$$= \sum_{AB=1} (x, y)_o^T / \sum AB$$

where Cross is the intersection position, $AB = \text{Arm}(x, y)_o \times \text{Border}(x, y)_o$.

Furthermore, the coordinates of the arm region farthest from the intersection position 507 are detected, as a fingertip position 508, by $$\text{Hand} = (x_H, y_H)_o^T \quad (5)$$

$$= \arg_S \max(\|\text{Cross} - (x, y)_o^T\|_2 | \text{Arm}(x, y)_{o=1})$$

where Hand is the fingertip position, $$S = (x, y)_o^T$$

The above processing is performed for each image in which the arm is detected in the input region.

From Computation of Base Position to Transformation of Fingertip Position

Upon detecting the retreat of the arm from the input region, based on the intersection position "Cross" calculated from each image, the average position of the intersection positions "Cross" is computed, as a base position 509, by $$\text{Base} = (x_B, y_B)_o^T \quad (6)$$

$$= \sum_{Nin}^{Nout} \text{Cross} / (Nout - Nin)$$

where Base is the base position,

Nin is the number (frame number) of the image in which the arm is inserted into the input region, and Nout is the number of the image immediately before the image in which it is determined that the arm retreats from the input region.

The origin of a gesture coordinate system 510 is defined as the base position 509. An origin "Origin" of the gesture coordinate system is represented by $$\text{Origin} = (0, 0)_g^T \quad (7)$$

$$= \text{Base}$$

$$= (x_B, y_B)_o^T$$

where "g" at the end represents the gesture coordinate system.

Vector $\overrightarrow{BT}$ from the origin "Origin" to the manipulation target position "Target" is defined as the V axis of the gesture coordinate system. The unit vector of the V axis is represented by $$\vec{V} = \overrightarrow{BT} / \|\overrightarrow{BT}\|_2 \quad (8)$$

where $\|\vec{X}\|_2$ represented the length of a vector $\vec{X}$.

Furthermore, a vector obtained by rotating the vector $\vec{V}$ clockwise by 90° is defined as the unit vector of the U axis. The unit vector of the U axis is represented by $$\vec{U} = \begin{bmatrix} 0 & -1 \\ 1 & 0 \end{bmatrix} \vec{V} \quad (9)$$

The gesture coordinate system is thus determined. The fingertip position "Hand" of each image calculated by equation (5) is transformed into a fingertip position "Hand'" on the gesture coordinate system by $$\text{Hand}' = (u_H, v_H)_g^T \quad (10)$$

where $u_H = \{(x_H - x_B)(y_T - y_B) - (y_H - y_B)(x_T - x_B)\} / \sqrt{\{(x_T - x_B)^2 + (y_T - y_B)^2\}}$, and $v_H = \{(x_H - x_B)(x_T - x_B) + (y_H - y_B)(y_T - t_B)\} / \sqrt{\{(x_T - x_B)^2 + (y_T - y_B)^2\}}$ When the gesture feature amounts are transformed into the coordinate system based on the motion of the manipulation object in this way, gesture recognition processing independent of the user's position and orientation can be performed.

Modification of Embodiment

An example has been described above in which the manipulation target position determination unit 205 determines a portion near the center of the input region as the manipulation target position. However, the manipulation target position may be determined based on the position of an object placed on the table 301 or an image displayed on the table 301.

Another method of determining a manipulation target position will be explained with reference to FIGS. 7A and 7B. As shown in FIG. 7A, a position 602 of center of gravity of an object (or image) 601 on the table 301 may be determined as the manipulation target position. When an image to be manipulated by a gesture is displayed on the table 301, the user is assumed to make a gesture while almost facing the image, and the gesture coordinate system is expected to be determined more precisely.

The manipulation target position may be determined based on the fingertip position at the start or end of a gesture or during execution of a gesture. For example, as shown in FIG. 7B, an average position 603 of fingertip positions during execution of a gesture may be determined as the manipulation target position. This makes it possible to define the gesture coordinate system from the fingertip position during execution of a gesture even when the input region is not explicitly designated, and the manipulation target position cannot uniquely be determined.

An example has been described above in which gesture recognition is performed by defining the gesture coordinate system based on the two-dimensional information of an image captured by the camera 105. However, gesture recognition may be performed based on three-dimensional information using a distance sensor such as a stereo camera.

An example of a tabletop interface using the table 301 having a video display function has been described above. However, the present invention is not limited to this and is applicable to various systems having a gesture recognition function, such as a system including a projector and a screen and an MR (Mixed Reality) system.

Second Embodiment

Information processing according to the second embodiment of the present invention will be described next. Note that the same reference numerals as in the first embodiment denote the same parts in the second embodiment, and a detailed description thereof will be omitted.

FIG. 8 is a block diagram showing the functional arrangement of an information processing apparatus according to the second embodiment. Note that the function arrangement shown in FIG. 8 is implemented by causing a CPU 101 to execute a program and control a camera 105 and the like.

In the function arrangement according to the second embodiment shown in FIG. 8, the arrangement of a manipulation target position determination unit 205 is different from the first embodiment. The manipulation target position determination unit 205 includes an estimator 701, a determiner 702, and a decider 703.

The estimator 701 estimates the average position of a manipulation object during execution of a gesture as the approximate position (manipulation target position) of the manipulation target. The determiner 702 determines, based on the estimated manipulation target position, a manipulation target by a gesture from a plurality of objects placed on a table 301 or a plurality of images displayed on the table 301. The decider 703 determines the manipulation target position based on the position of the determined manipulation target.

Gesture recognition processing according to the second embodiment will be described with reference to the flowcharts of FIGS. 9 and 10. The information processing apparatus causes the camera 105 to start capturing in accordance with a user instruction input via an input unit 107, and thus starts gesture recognition processing.

Figure 9:
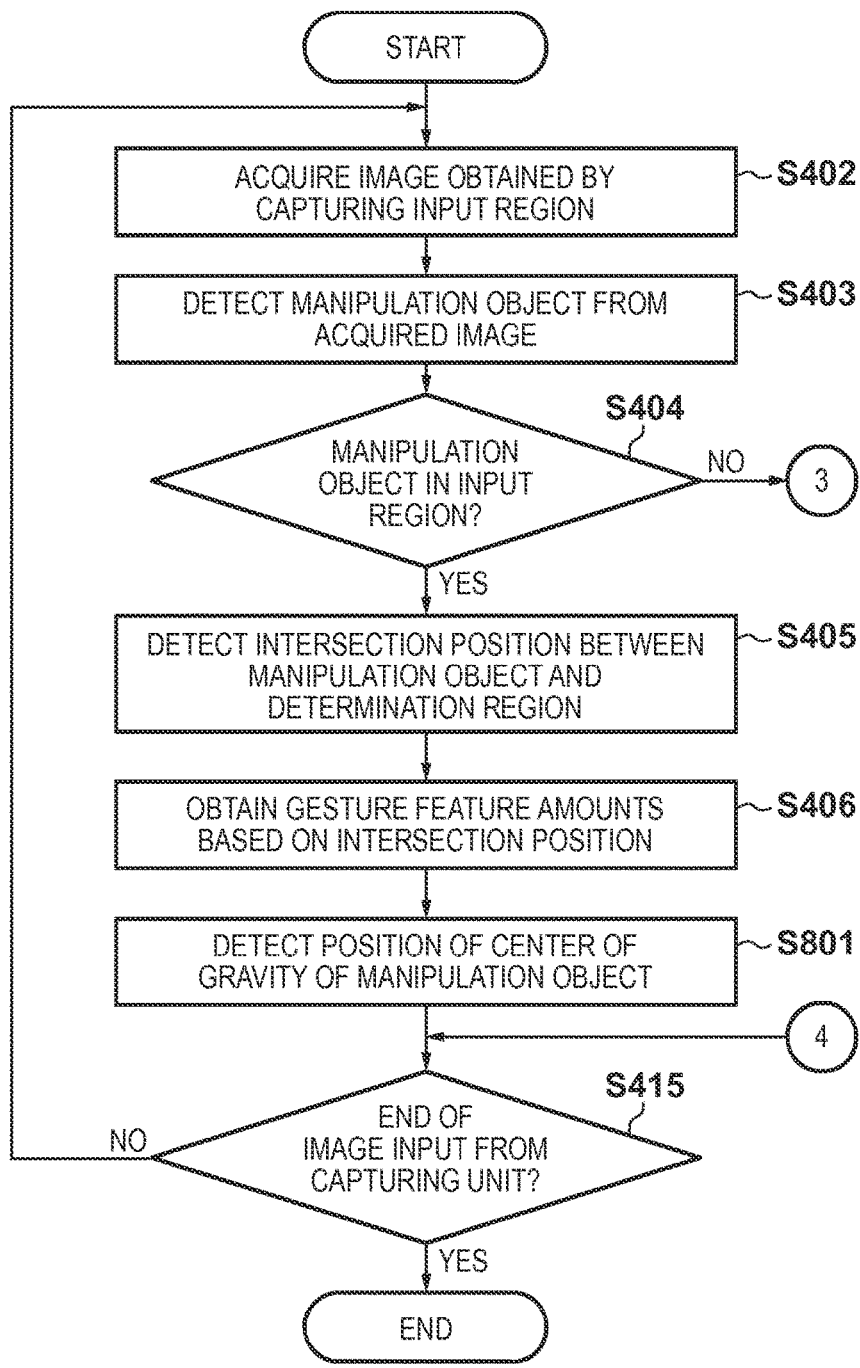

Note that the processes of steps S402 to S415 in FIGS. 9 and 10 are the same as the processes of the first embodiment, and a detailed description thereof will be omitted.

In the first embodiment, after the start of gesture recognition processing, the center coordinates of the input region are determined as the manipulation target position (S401). In the second embodiment, however, acquisition of the image of the input region (S402) and detection of the manipulation object (S403) are performed without determining the manipulation target position.

Upon determining in step S404 that the manipulation object exists in the input region, detection of the intersection position (S405) and obtaining of gesture feature amounts (S406) are performed, and after that, the estimator 701 detects the position of center of gravity of the manipulation object (S801). For example, the position of center of gravity of a skin color region detected in step S403 is detected as the position of center of gravity of the manipulation object (arm). Note that the detection target of the estimator 701 is not limited to the position of center of gravity and may be a position associated with a gesture such as a fingertip position or a line-of-sight position. After that, the process advances to step S415.

Upon determining in steps S404 and S407 that the manipulation object retreats from the input region, computation of the base position (S408) is performed, and after that, the estimator 701 estimates the average position of the positions of center of gravity of the manipulation object as the approximate position of the manipulation target (S802). That is, the estimator 701 regards the action from insertion of the manipulation object into the input region to the retreat as one gesture, and computes the average position of the positions of center of gravity of the manipulation object during this action as the approximate position (to be referred to as an "estimated position" hereinafter) of the manipulation target. Note that if the timings of the start and end of the gesture can be detected from, for example, a state transition based on a change in the moving speed of the manipulation object, the average position of the positions of center of gravity from the start to the end of the gesture may be computed as the approximate position of the manipulation target.

The determiner 702 calculates a line L passing through the computed base position and the estimated position (S803), and determines the manipulation target by a gesture from a plurality of objects placed on the table 301 or a plurality of images displayed on the table 301 (S804). For example, a target G having the shortest distance from the line L is determined as the manipulation target. The decider 703 determines the position of center of gravity of the manipulation target (target G) as the manipulation target position (S805). After, that, the process advances to step S409.

Gesture coordinate system determination processing will be described with reference to FIGS. 11A to 11D. FIGS. 11A to 11D show images obtained by capturing the space on the table 301 from the camera 105. As shown in FIG. 11A, a plurality of images 901 are displayed on the table 301.

As shown in FIG. 11B, the user's arm region during execution of a gesture is detected, and positions 902 of center of gravity are detected. When the arm retreats from the input region, an average position 903 of the positions of center of gravity of the arm region is calculated, and a base position 904 is computed, as in the first embodiment. A line 905 (line L) passing through the base position 904 and the average position 903 of the positions of center of gravity is calculated. The line 905 is expected to almost represent the direction of the manipulation target by a gesture.

As shown in FIG. 11C, the image G having a shortest distance 907 between the line L and a position 906 of center of gravity is determined out of the plurality of images 901 displayed on the table 301. When the manipulation target is determined based on the clearance from the line L, the manipulation target position is expected to be determined more accurately. As shown in FIG. 11D, a gesture coordinate system 909 having the base position 904 as the origin and a vector from the base position 904 to a position 908 of center of gravity of the target G as one axis is determined.

As described above, even when a plurality of targets are arranged (that is, a plurality of objects are placed or a plurality of images are displayed) in the input region, the manipulation target by a gesture can be estimated, and gesture feature amounts can be transformed into a coordinate system based on motion of the manipulation object and the manipulation target position. It is therefore possible to perform gesture recognition processing independent of the user's position and orientation.

Modification of Embodiment

In the second embodiment, an example has been described in which the manipulation target is specified, the gesture coordinate system based on the manipulation target is determined, the gesture feature amounts (fingertip position) are coordinate-transformed into the gesture coordinate system, and gesture recognition processing is performed based on the feature amounts after coordinate transformation. Conversely, the manipulation target may be specified based on a gesture recognition result.

FIG. 12 is a block diagram showing the functional arrangement of an information processing apparatus according to a modification. Note that this functional arrangement is different from that of the first embodiment shown in FIG. 2 in the arrangement of the manipulation target position determination unit 205 including a candidate setting unit 711 and a determiner 712.

The candidate setting unit 711 detects, from a captured image, the positions of center of gravity of a plurality of objects placed on the table 301 or a plurality of images displayed on the table 301, and sets a plurality of manipulation target candidates based on the positions of center of gravity.

A coordinate system determination unit 206 determines a plurality of gesture coordinate systems based on the base position and the manipulation target candidates. A coordinate transformation unit 208 coordinate-transforms gesture feature amounts into each gesture coordinate system. A gesture recognition unit 211 recognizes a gesture based on the feature amounts transformed into each gesture coordinate system. That is, matching is performed between a gesture model 210 and the feature amounts after coordinate transformation, and a gesture represented by a model having the maximum likelihood is obtained as a recognition result.

Feature amounts coordinate-transformed into an appropriate gesture coordinate system are expected to have a high goodness of fit to the gesture model. The determiner 712 determines, based on the recognition result supplied from the gesture recognition unit 211, the gesture coordinate system used for coordinate transformation of the feature amounts corresponding to the model having the maximum likelihood, and selects, as a manipulation target, a manipulation target candidate used to determine the gesture coordinate system. The position of center of gravity of the selected manipulation target is determined as the manipulation target position.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-121187, filed Jun. 7, 2013, which is hereby incorporated by reference herein in its entirety.

What is claimed is:

1. An information processing apparatus for recognizing a gesture, comprising:
  a processor configured to:
    acquire an image obtained by capturing a gesture input region in which a gesture input is made;
    detect an object being used for the gesture input from the acquired image;
    detect image coordinates of an intersection point at which the detected object crosses a determination region being provided in the acquired image;
    compute base image coordinates based on an image coordinates group detected from images obtained by capturing the gesture input region;
    determine, based on reference image coordinates and the base image coordinates, a gesture coordinate system being used for recognizing a gesture made by the object;
    transform a feature amount group of the object to a transformed feature amount group of the object in the gesture coordinate system,
    recognize a movement of the object across the images, as a gesture made by the object, based on the transformed feature amount group in the gesture coordinate system;
    estimate average image coordinates of the image coordinates group of the object; and
    determine a single manipulation target object from a plurality of manipulation target objects arranged in the gesture input region based on a line that connects the average image coordinates and the base image coordinates, wherein the reference image coordinates are image coordinates corresponding to the determined manipulation target object.

2. The apparatus according to claim 1, wherein the processor is further configured to: learn, as a gesture model, the movement of the object across the images based on the transformed feature amount group in the gesture coordinate system.

3. The apparatus according to claim 2, wherein the processor is further configured to: perform gesture recognition based on the gesture model and the transformed feature amount group in the gesture coordinate system.

4. The apparatus according to claim 3, wherein the processor is further configured to:

determine, for each of plural candidates among the plurality of manipulation target objects arranged in the gesture input region, the gesture coordinate system based on image coordinates of the plural candidates and the base image coordinates, determine a single candidate from the plural candidates based on the transformed feature amount group and the gesture model, and set image coordinates of the determined single candidate as the reference image coordinates.

5. The apparatus according to claim 1, wherein the feature amount group of the object is image coordinates of a distal end, of the object, farthest from the image coordinates of the intersection point.

6. The apparatus according to claim 1, wherein the determined manipulation target is an object to be manipulated by the gesture.

7. The apparatus according to claim 1, wherein the base image coordinates are an origin of the gesture coordinate system.

8. The apparatus according to claim 1, wherein a vector from the base image coordinates to the reference image coordinates is one axis of the gesture coordinate system.

9. The apparatus according to claim 1, wherein the determination region is a boundary of the gesture input region.

10. The apparatus according to claim 1, wherein the determination region is a boundary of a capturing range of a camera that captures the gesture input region.

11. An information processing method for recognizing a gesture, comprising:

acquiring an image obtained by capturing a gesture input region in which gesture input is made;

detecting an object being used for the gesture input from the acquired image;

detecting image coordinates of an intersection point at which the detected object crosses a determination region being provided in the acquired image;

computing base image coordinates, based on an image coordinates group which has been detected from images obtained by capturing the gesture input region;

determining, based on reference image coordinates and the base image coordinates, a gesture coordinate system being used for recognizing a gesture made by the object;

transforming a feature amount group of the object which has been detected from the images to a feature amount group of the object on the gesture coordinate system, and recognizing a movement of the object across the images, as a gesture made by the object, based on the transformed feature amount group on the gesture coordinate system;

estimating average image coordinates of the image coordinates group of the object which has been detected from the images; and determining a single manipulation target object from a plurality of manipulation target objects arranged in the gesture input region based on a line that connects the average image coordinates and the base image coordinates, wherein the reference image coordinates are image coordinates corresponding to the determined manipulation target object.

12. A non-transitory computer-readable storage medium storing a computer program for causing a computer for recognizing a gesture to function as:

an acquisition unit configured to acquire an image obtained by capturing a gesture input region in which gesture input is made;

a first detection unit configured to detect an object being used for the gesture input from the image acquired by the acquisition unit;

a second detection unit configured to detect image coordinates of an intersection point at which the detected object crosses a determination region being provided in the image acquired by the acquisition unit;

a computation unit configured to compute base image coordinates, based on an image coordinates group that the second detection unit has detected from images obtained by capturing the gesture input region;

a first determination unit configured to determine, based on reference image coordinates and the base image coordinates, a gesture coordinate system being used for recognizing a gesture made by the object;

a recognition unit configured to transform a feature amount group of the object that the first detection unit has detected from the images to a feature amount group of the object on the gesture coordinate system, and recognize a movement of the object across the images, as a gesture made by the object, based on the transformed feature amount group on the gesture coordinate system;

an estimation unit configured to estimate average image coordinates of the image coordinates group of the object that the first detection unit has detected from the images; and a second determination unit configured to determine a single manipulation target object from a plurality of manipulation target objects arranged in the gesture input region based on a line that connects the average image coordinates and the base image coordinates, wherein the reference image coordinates are image coordinates corresponding to the determined manipulation target object.

* * * * *